(No Model.) 2 Sheets—Sheet 1.
M. SCHNEIDER.
REEL FOR HARVESTERS.
No. 539,829. Patented May 28, 1895.
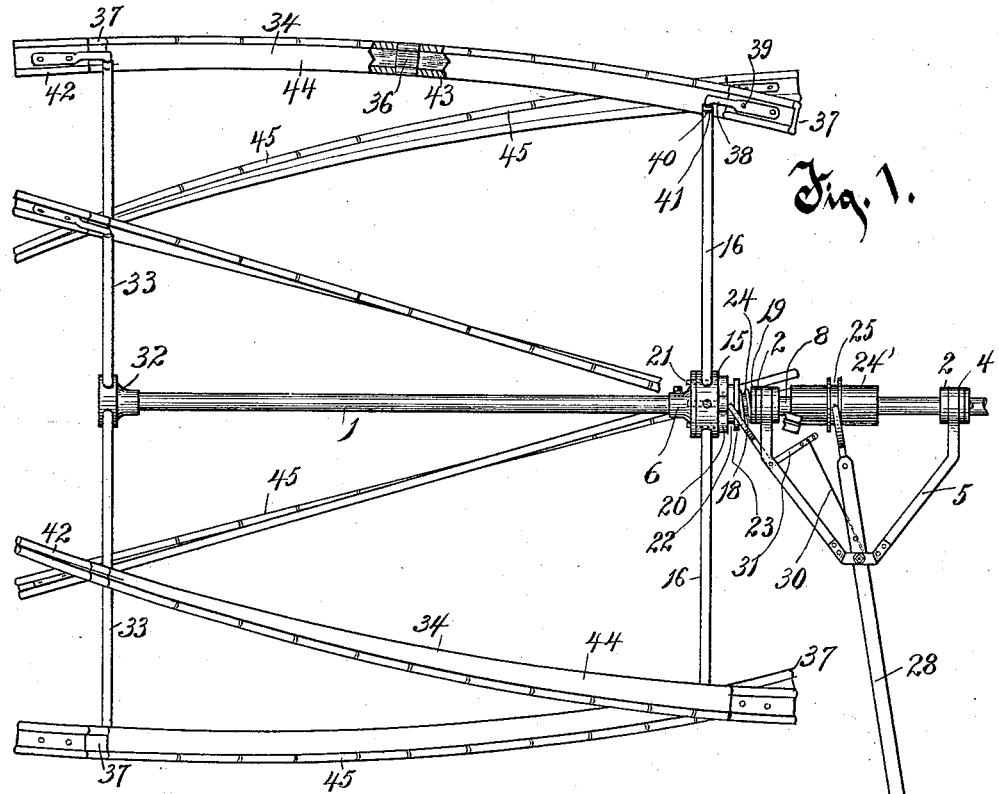
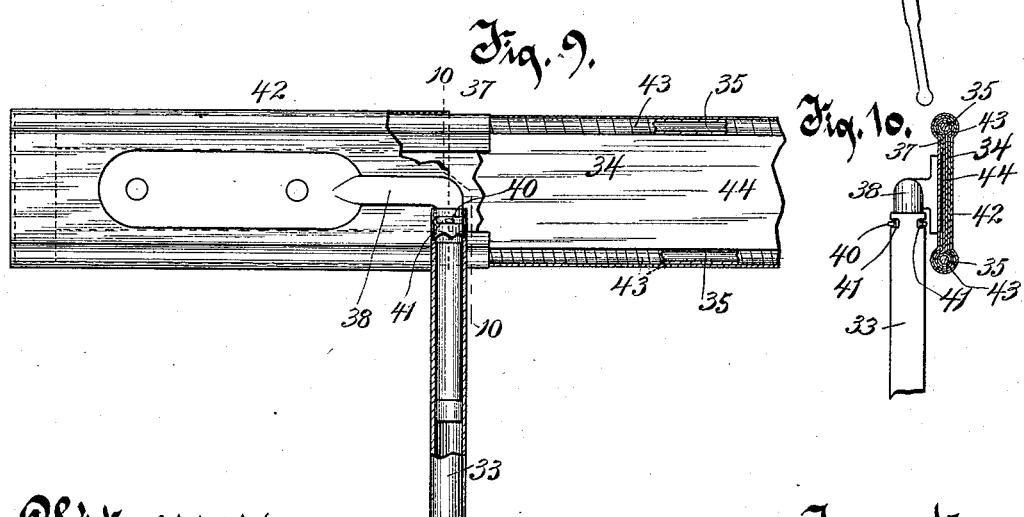
Witnesses.
Inventor.
Mathias Schneider,
By Benedict and Morsell
Attorneys.

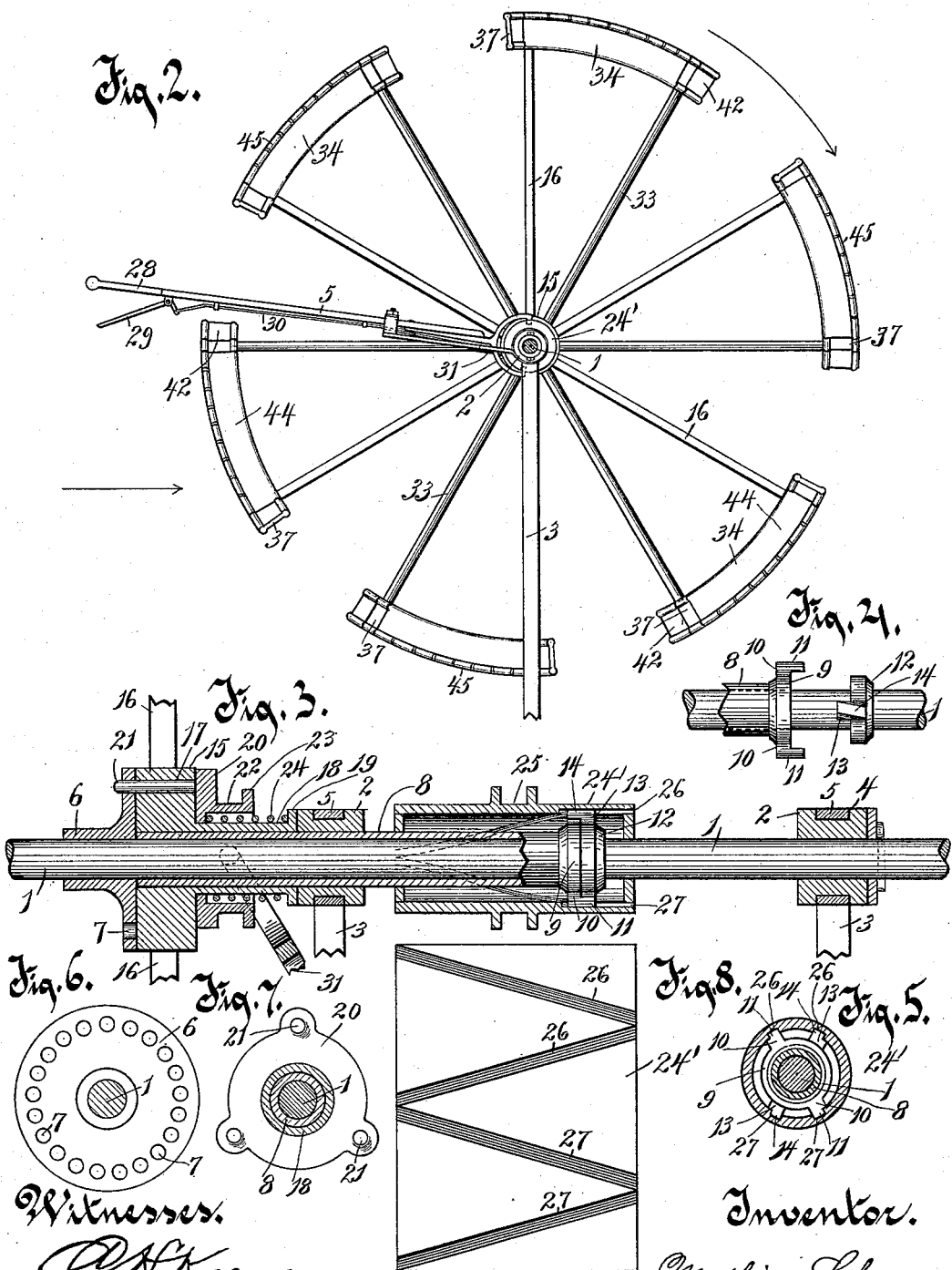

UNITED STATES PATENT OFFICE.

MATHIAS SCHNEIDER, OF WEST BEND, WISCONSIN.

REEL FOR HARVESTERS.

SPECIFICATION forming part of Letters Patent No. 539,829, dated May 28, 1895.

Application filed August 25, 1893. Renewed November 16, 1894. Serial No. 529,063. (No model.)

*To all whom it may concern:*

Be it known that I, MATHIAS SCHNEIDER, of West Bend, in the county of Washington and State of Wisconsin, have invented a new and useful Improvement in Reels for Harvesters, of which the following is a description, reference being had to the accompanying drawings, which are a part of this specification.

My invention has relation to improvements in reels for harvesters, and like machines, for pressing backward and holding the stalks of grain in position for being severed by the knives.

In the travel of machines of this character over the ground, bent or deflected stalks are often encountered which in many machines it is impossible for the reel to reach and gather in toward the cutter-bar. It is, therefore, the object of my invention to provide a construction which is not alone adaptable for bringing the straight grain to the platform, but also a construction wherein the bent or deflected stalks may be reached and gathered in properly, and this while the machine continues on its travel, and without the necessity of stopping the rotation of the reel shaft.

An incidental object is to provide, in a machine having the above characteristics, means whereby the grain is held close to the cutter-bar, so as to insure the cutting of said grain.

With the above objects in view the invention consists of the device and parts as hereinafter described and claimed, or their equivalents.

In the drawings, Figure 1 is a plan view of the device with a portion of one of the horizontal slats in section to show the interior connecting-plate. Fig. 2 is an end elevation. Fig. 3 is a longitudinal section of Fig. 1. Fig. 4 is a fragmentary detail of a portion of the main shaft and the encircling hollow shaft. Fig. 5 is a transverse section of Fig. 3, taken on a plane to the right of the annular exterior groove of the cylinder. Fig. 6 is a detail view of the apertured disk. Fig. 7 is a view of the outer face of the pin-carrying disk, the shaft and surrounding parts being in section. Fig. 8 is a view showing the cylinder spread out as a flat surface to illustrate clearly the arrangement of the grooves therein. Fig. 9 is an enlarged detail view of a fragment of one of the horizontal slats and a portion of one of the hollow spokes, parts being broken away; and Fig. 10 is a transverse section of Fig. 9 on the line 10 10 of said figure.

Like numerals of reference denote like parts throughout the several views.

Referring to the drawings, the numeral 1 indicates a main shaft, which is rotated by a gear or pulley connection, or equivalent, not shown, with the axle, or other convenient part of the harvester. This shaft is mounted in bearings 2, 2, provided at the upper end of standards 3, 3, projecting from the harvester frame. These bearings are formed with annular recesses 4, which receive the eyes formed upon the ends of a bracket 5, whereby a swing or turn of the bracket is permitted, which is necessary when the reel mechanism is adjusted, for which provision is usually made in machines of this character.

Fixedly mounted upon the main shaft 1, so as to rotate therewith, is a disk 6, provided with a series of apertures 7, annularly arranged. A hollow shaft 8 encircles shaft 1. This hollow shaft, at one end, abuts against the inner face of disk 6, and at its opposite end is provided with an annular enlargement or collar 9, said collar in turn having projecting therefrom, at diametrically opposite points, angular lugs 10, 10, the horizontal portions of the lugs formed with inclined ribs 11, 11. Upon the main shaft 1 is fixed a similar collar 12, provided with diametrically opposite angular lugs 13, 13, said lugs in turn, having inclined ribs 14, 14.

Surrounding fixedly the hollow shaft 8, and bearing against the inner face of disk 6, is a hub 15, from the periphery of which radiate hollow arms or spokes 16. This hub is intersected by a series of pin apertures 17, and is also provided with a projecting sleeve 18, terminating at its end in an annular flange 19, which abuts against one of the bearings 2. Bearing against one face of hub 15 is a disk 20, said disk provided with a series of projecting pins 21, extending through the apertures 17 of the hub, and normally through any of the apertures 7 of disk 6. Extending from the disk 20 is a short sleeve 22, said sleeve being free from contact with the sleeve 18, for the greater portion of its length and provided at its end with an annular flange 23, between which and the face of the disk an annular groove is formed. A coiled spring 24 encircles sleeve 18, one end of said spring bearing against the annular flange 19, and the other end bearing against the face of disk 20, the annular space between the sleeve 22 of said disk 20, and the sleeve 18, being sufficient for the accommodation of the spring.

Surrounding the end of the hollow shaft, and the portion of the main shaft carrying the collar 12, is a cylinder 24', said cylinder provided exteriorly with annular lugs, forming an annular groove 25. The diameter of the cylinder is sufficient to permit of the reception therein of the angular lugs 10 and 13, and is provided interiorly, at opposite points, with diverging grooves 26, 26 and 27, 27, as clearly shown in Fig. 8. These grooves are adapted to receive the respective inclined ribs 11, 11 and 14, 14 of the angular lugs 10, 10 and 13, 13, said ribs fitting, respectively, in diagonally opposite grooves.

Pivoted medially to the bracket 5 is an operating handle 28, said handle having a forked inner end which is adapted to engage the annular groove 25 of the cylinder, whereby, when a lateral thrust is given to the handle, a similar movement is imparted to the cylinder. A bell-crank lever 29 is pivoted near the outer end of the handle, said bell-crank having connected to its short arm a rod or link 30. This link extends through suitable guides on the handle to near the inner end of said handle, and is then turned off to engage any of the apertures of an arm of a bell-crank lever 31, which is pivoted to one of the arms of the bracket 5. The other arm of this bell-crank lever is forked or bifurcated to engage the annular groove of disk 20.

To one extremity of shaft 1 is rigidly secured a hub 32, from which radiate a series of hollow arms or spokes 33. Each spoke 33 is connected to a spoke 16 by means of a horizontal slat 34. Each slat is composed of parallel flexible bars 35, 35, connected medially by a transverse plate 36, by means of which the relative distance between the two bars is always maintained. The inner ends of the bars are connected by means of plates 37, which are bent around the bars, as clearly shown in Fig. 1. Attached to the inner end of each slat is an angular arm 38. The widened portion of the horizontal part of said arm receives screws 39, 39, which pass through the plate 37, and form the means for attachment. The vertical member of each of these arms 38 passes into one of the hollow arms or spokes 16, and is intersected by a split pin 40, the ends of said split pin working in segmental slots 41 in each spoke. The opposite ends of the parallel bars are connected by plates similar to plate 37, and designated by the same reference numeral. A sleeve or loop 42 is adapted to slide on this latter end plate, said sleeve or loop having attached thereto an angular arm similar to 38, and designated by the same reference numeral, the vertical member of said arm passing into a hollow arm or spoke 33, and provided with an intersecting pin similar to 40, said pin working in a segmental slot in the spoke.

In order to augment the resiliency of the parallel bars 35, I prefer to surround the same with coiled springs 43, 43. Uniting these parallel bars throughout their entire length is a canvas covering 44, said covering, at the points where it loops around the rods and springs, being protected by a series of short metallic loops 45, a series of loops being necessary rather than continuous loops, in order that the bending and twisting of the rods may not be interfered with.

The above being a description of the construction of my invention, its operation will now be described.

By reason of the main shaft 1 being provided with the angular lugs 13, 13 engaging diagonally opposite grooves of the cylinder 24', it is apparent that the rotation of said main shaft is imparted to the cylinder, and the rotation of the cylinder in turn imparted to the hollow shaft 8 by reason of the angular lugs 10, 10 of said hollow shaft engaging the other diagonally opposite grooves of the cylinder. In consequence of this construction, the main shaft, hollow shaft, cylinder and disk 20 will all rotate in unison, and synchronously so long as the pins 21 engage the aperture 7 of disk 6. In order to unlock the hub 15 and disk 20 from the fixed disk of the main shaft, all that is necessary to be done is simply to press upon the bell-crank lever 29, which will have the effect of pulling on link 30, and consequently rotating bell-crank lever 31 on its pivot, and through the forked end of one arm of said bell crank, drawing the disk 20 laterally, so that the pins 21 thereof will be withdrawn from engagement with the apertures of disk 6. If, now, we suppose that the spokes 16 and 33 are parallel so that the connecting slats 34 are arranged in a straight line, and it is desired to adjust them so as to throw the same at an inward incline, as indicated in Figs. 1 and 2, pressure upon the bell crank 29 is still maintained, and the handle 28 turned toward the right, as indicated in Fig. 1. As the handle is thus turned, the cylinder 24' is thrust laterally in an opposite direction, or toward the left. As this is done, the respective lugs 10, 10 and 13, 13 are made to ride in their respective grooves 26 and 27, toward the diverging ends of said grooves, which, of course, has the effect of forcing the lugs apart. As the end hub 32 is rigidly attached to shaft 1 the position of the spokes carried by said hub necessarily always remains fixed and permanent. With regard to the hub 15, however, so long as pressure is maintained on the bell-crank lever 29, the pins 21 are not in engagement with the apertures of the disk 6, and consequently this hub is free to be rotated with the hollow shaft 8 to which it is rigidly attached, and consequently when the handle 28 is operated in the manner just described, the hub while still being rotated by the main shaft 1, by reason of the engagement, through the cylinder 24' and the respective lugs 11, 11 and 13, 13 of the hollow shaft with said main shaft 1, yet at the same time the rotation of said hollow shaft and said hub 15 carried thereby is accelerated, or, in other words, they rotate together faster than the main shaft, and consequently the position of the hub 15 is changed, thereby throwing the spokes carried by said hub out of parallelism or farther out of line with the spokes carried by the hub 32. As the spokes 16 are thus thrown out of parallelism with the spokes 33, the horizontal slats 34 are necessarily slanted or inclined inward. When the slats are thus inclined, it is necessary that the lengths of the slats should be increased so that they will correspond in length to the cutter, and therefore be enabled to bring the grain to the full length of said cutter. It is for this purpose that I provide the sleeves 42, which automatically slide outward, as inclinations of the slats are being changed. It will thus be seen that no matter what may be the inclination of the slats, they are at all times of equal length with the length of the cutter, and consequently the grain is brought to the cutter along its full length, so that the complete cutting capacity of the cutting edge is utilized. If this elongating of the slats were not permitted, it is obvious that with the inclining of said slats, they would be shortened relatively to the cutter, and consequently grain would not be carried to the cutting edge throughout its full length, thereby leaving a portion of said cutting edge inactive. With the adjustment of the inclinations of the slats, a certain twist is necessarily given thereto, as shown fully in Fig. 1, and in order to provide for this twist or bend, the slats are made flexible, by means of constructing the same of the parallel spring-encircled rods, connected by the canvas covering. When the amount of inclination desired is secured, the pins 21 are brought to register with the proper apertures of disk 6, and pressure upon the bell-crank lever 29 removed. Through the action of the coiled spring 24 acting on the disk 20, the pins carried by said disk are made to enter the apertures of disk 6, and thus lock the hub 15 in its adjusted position. Of course, when reverse inclinations of the slats are desired, the handle 28 is turned toward the left, which has the effect of moving cylinder 24' to the right.

In order to hold the grain close to the cutter bar so as to insure the cutting of the grain, it is necessary that all parts of the horizontal slats in their rotation should be presented at an equal distance to the cutters, and in close proximity thereto. In order to attain this object, when the blades are adjusted at inclinations it is necessary that the slats should assume a curved or bowed form. The slats, as before stated, being flexible, this is readily attainable, inasmuch as when the spokes of the hub 15 are thrown out of parallelism with the fixed spokes 33 both sets of spokes still point to the center of axis. This is rendered possible by the flexible character of the slats, and their consequent capability of bowing or curving outward.

From the preceding description, it will be seen that the reel bars are inclined or turned obliquely, and simultaneously twisted longitudinally, or given an auger shape or conveyer-screw form, and also bent edgewise. The inclining or oblique turning of the bars serves to carry bent or deflected stalks to the cutter in a straight line, the longitudinal twist to compel the face of each reel bar to be presented to the grain, and the edgewise bend compelling all parts of each horizontal reel bar to be presented at an equal distance to the cutter. Besides this, simultaneously with these different adjustments of the reel bars, the sleeves 42 on the left hand end of the reel bars are automatically slid outwardly, whereby the reel bars are made to adapt themselves to the full length of the cutter bar, notwithstanding the fact of the adjustments just referred to, which were it not for these sleeves, would cause the reel bars to fall far short of the length of the cutter bar, with the result that the complete cutting edge of said cutter bar would not be utilized.

I do not wish to be understood as confining myself to the exact construction of details shown in the accompanying drawings, as slight modifications may be made without departing from the broad spirit and scope of my invention, as for instance, two of the interior grooves may be inclined to receive the lugs of the hollow shaft, while the other two grooves which receive the lugs of the collar of the main shaft may be made perfectly straight. This arrangement would secure successful results, although the inclination to which the spokes of hub 15 could be adjusted would be somewhat more limited.

Having thus described my invention, what I claim, and desire to secure by Letters Patent, is—

1. In a harvester reel, the combination, of a main shaft, a hub fixed upon said shaft, and carrying radial arms or spokes, a hub adjustable upon the shaft, and also carrying radial arms or spokes, transverse slats connecting the respective spokes, said slats consisting of parallel flexible rods united by flexible material, and mechanism for adjusting the adjustable hub upon the shaft, and retaining it in its adjusted position, substantially as set forth.

2. In a harvester reel, the combination, of a main shaft, a hub fixed upon said shaft, and carrying radial arms or spokes, a hub adjustable upon the shaft, and also carrying radial arms or spokes, transverse slats connecting the respective spokes, said slats consisting of parallel flexible spring-encircled rods united by flexible material, and mechanism for adjusting the adjustable hub upon the shaft, and retaining it in its adjusted position, substantially as set forth.

3. In a harvester reel, the combination of a main shaft, a hub fixed upon said shaft, and carrying radial arms or spokes, a hub adjustable upon the shaft, and also carrying radial arms or spokes, transverse slats connecting the respective spokes, said slats consisting of parallel flexible rods, united by flexible material, and having a central separating plate, end reinforcing plates, and a series of loops embracing the rods, and mechanism for adjusting the adjustable hub upon the shaft, and retaining it in its adjusted position, substantially as set forth.

4. In a harvester reel, the combination, of a main shaft, a hub fixed upon said shaft, and carrying radial arms or spokes, said arms or spokes provided at their upper ends with sockets having slots therein, a hub adjustable upon the shaft, and also carrying radial arms or spokes having sockets at their upper ends provided with slots, flexible slats provided with end depending arms adapted to enter the sockets of the respective radial arms or spokes, pins passing through the slots of said radial arms or spokes and through the depending arms, and mechanism for adjusting the adjustable hub upon the shaft, and retaining it in its adjusted position, substantially as set forth.

5. In a harvester reel, the combination, of a main shaft, a hub fixed upon said shaft, and carrying radial arms or spokes, a disk fixed upon the shaft provided with a series of annularly arranged apertures, a spring-actuated disk longitudinally movable on the shaft, and normally rotatable synchronously with the shaft, said disk provided with laterally-extending fingers, a hub interposed between the respective disks, and continuously rotated by the reel shaft, the rotation being synchronous when the hub is clutched to the main shaft, said hub provided with apertures to receive the pins and also provided with radially extending arms or spokes, flexible slats connecting the respective radial arms or spokes, mechanism for imparting a longitudinal movement to the spring-actuated disk for withdrawing the pins from engagement with the fixed disk, and means for changing the rate of speed of the hub over that of the reel shaft, when said hub is unclutched from the fixed disk, whereby the pins are made to engage different apertures of said fixed disk, and the adjustable hub thus adjusted upon the shaft, substantially as set forth.

6. In a harvester reel, the combination of a main shaft provided with projecting lugs, a hub fixed upon said shaft, and carrying radial arms or spokes, a disk fixed upon the shaft, and provided with a series of annularly arranged apertures, a hollow shaft surrounding the main shaft, and provided at one end with projecting lugs, a spring-actuated disk loose upon the hollow shaft, said disk provided with laterally-extending fingers, a hub fixed upon the end of the hollow shaft, and lying intermediate the fixed disk of the main shaft and the spring-actuated disk, said hub provided with radially extending arms or spokes, flexible slats connecting the respective radial arms or spokes, a cylinder surrounding the main shaft and the end of the hollow shaft, said cylinder provided interiorly with grooves adapted to receive the respective lugs of the main shaft and hollow shaft, a pivoted lever engaging the cylinder, and adapted to impart a longitudinal movement thereto, whereby the rate of rotation of the hollow shaft over that of the main shaft is changed, said handle also having a bell-crank lever secured thereto, a lever connected to the spring-actuated disk, and a rod or link connecting said lever to the bell-crank lever of the handle, whereby, when pressure is exerted on the bell-crank lever, the spring-actuated disk is moved laterally against the pressure of the spring, and the pins carried by the disk withdrawn from engagement with the fixed disk of the main shaft, substantially as set forth.

7. In a harvester reel, the combination, of a main shaft, a hub fixed upon said shaft, and carrying radial arms or spokes a disk fixed upon the shaft and provided with a series of annularly arranged apertures, a spring-actuated disk loose upon the shaft, said disk provided with laterally-extending fingers, an adjustable hub interposed between the respective disks, said hub provided with radial projecting arms or spokes, and also with transverse apertures, the latter adapted to be brought into register with the apertures of the fixed disk, said apertures, when registering adapted to receive the pins of the spring-actuated disk, flexible slats connecting the respective radial arms or spokes, and mechanism for imparting a longitudinal movement to the spring-actuated disk, against the action of the spring, whereby the pins are withdrawn from engagement with the fixed disk, to permit of the circular adjustment of the hub, substantially as set forth.

8. In a harvester reel, the combination, of a main shaft, a hub fixed upon said shaft and carrying radial arms or spokes, a hub adjustable upon the shaft, and also carrying radial arms or spokes, transverse slats, one end of each of which is attached to a spoke of the adjustable hub, a sliding sleeve at the opposite end of each slat, the sliding sleeves having the spokes of the fixed hub attached thereto, and mechanism for adjusting the other hub upon the shaft, and retaining it in its adjusted position, whereby each transverse slat is inclined, and its length simultaneously increased to correspond to the length of the cutter bar of the machine, substantially as set forth.

In testimony whereof I affix my signature in presence of two witnesses.

MATHIAS SCHNEIDER.

Witnesses:
AMUND HEGNA,
ELLING O. BERG.